(12) United States Patent
Bolanahalli et al.

(10) Patent No.: US 9,004,450 B2
(45) Date of Patent: Apr. 14, 2015

(54) FLUID VALVE (71) Applicant: Cummins Inc., Columbus, IN (US)

(72) Inventors: Onkarappa Bolanahalli, Columbus, IN (US); J. Victor Perr, Greenwood, IN (US); Parashuram Kapase, Pune (IN); Rohini U. Deutkar, Pune (IN); Ankur V. Garg, Pune (IN)

(73) Assignee: Cummins IP, Inc., Columbus, IN (US)

( * ) Notice: Subject to any disclaimer, the term of this patent is extended or adjusted under 35 U.S.C. 154(b) by 76 days.

(21) Appl. No.: 13/837,804

(22) Filed: Mar. 15, 2013

(65) Prior Publication Data

US 2014/0264122 A1 Sep. 18, 2014

(51) Int. Cl.
*F16K 5/00* (2006.01)
*F16K 3/04* (2006.01)

(52) U.S. Cl.
CPC ........................................ *F16K 3/04* (2013.01)

(58) Field of Classification Search
CPC .... F16K 1/2007; F16K 1/2014; F16K 1/2057
USPC ......... 251/160, 180, 181, 192, 228, 298, 299, 251/309, 314, 317, 301
See application file for complete search history.

(56) References Cited

U.S. PATENT DOCUMENTS

| | | | |
|---|---|---|---|
| 1,052,633 A * | 2/1913 | Whiteman ................. | 137/527.2 |
| 2,048,943 A * | 7/1936 | Munn ........................ | 137/527.4 |
| 2,514,838 A * | 7/1950 | Callahan ..................... | 137/517 |
| 4,071,220 A | 1/1978 | Iino | |
| 4,073,473 A | 2/1978 | Rihm et al. | |
| 4,241,895 A * | 12/1980 | Sternenberg et al. ......... | 251/173 |
| 4,256,285 A | 3/1981 | Davidson | |
| 4,281,680 A * | 8/1981 | Ripert ........................ | 137/527.4 |
| 4,662,604 A * | 5/1987 | Cook ........................ | 251/129.07 |
| 5,170,992 A | 12/1992 | Lenberg | |
| 5,186,433 A | 2/1993 | Pausch | |
| 5,247,964 A * | 9/1993 | DeLange ................. | 137/599.05 |
| 6,024,121 A | 2/2000 | Anderson | |
| 6,024,125 A | 2/2000 | Baumann | |
| 6,206,024 B1 | 3/2001 | Naberhaus | |
| 6,206,221 B1 | 3/2001 | Bando et al. | |
| 2007/0029517 A1 | 2/2007 | Lenihan | |
| 2009/0014674 A1* | 1/2009 | Grissom et al. ............... | 251/298 |

FOREIGN PATENT DOCUMENTS

EP 1248925 B1 2/2006

OTHER PUBLICATIONS

Roto-Disc, Heavy-Duty Spherical Valve, http://www.rotodisc.com/roto-disc.htm, known as early as Jan. 14, 2013.
International Search Report and Written Opinion for PCT Application No. PCT/US2014/018234, mail date Jun. 12, 2014, 14 pages.

* cited by examiner

*Primary Examiner* — Matthew W Jellett
(74) *Attorney, Agent, or Firm* — Foley & Lardner LLP (57) ABSTRACT

Described herein is a fluid valve assembly includes a body that defines a fluid cavity. The body includes an inlet through which fluid enters the fluid cavity and an outlet from which fluid exits the fluid cavity. The fluid valve assembly includes at least one arm rotatably coupled to the body and positioned within the fluid cavity. Additionally, the fluid valve assembly includes a flap coupled to the at least one arm. The flap includes a domed portion and a flat portion extending radially outwardly away from the domed portion.

16 Claims, 7 Drawing Sheets

FLUID VALVE

FIELD

This disclosure relates to valves, and more particularly to a fluid valve assembly for regulating the flow of a gaseous fluid through the valve assembly.

BACKGROUND

Many types of conventional fluid valves for regulating the flow of a fluid are known in the art. Such conventional fluid valves include butterfly valves, ball valves, globe valves, sluice valves, dual-plate check valves, swing check valves, single and double poppet valves, and rotary valves. These and other types of conventional fluid valves are commonly used to regulate the flow of a gaseous or pressurized fluid, such as exhaust gas or intake air, through a conduit.

Gaseous or pressurized fluid flow is particularly sensitive to restrictions or obstructions in the conduit. Such restrictions or obstructions induce an increase in backpressure (e.g., pressure drop) within the conduit or reduce a maximum flow rate through the conduit, which can result in various inefficiencies within a system, such as low fuel efficiency within an internal combustion engine. Many conventional fluid valves include components for actuating a flap or flow restriction element. For example, a traditional butterfly valve includes a shaft that extends across a diameter of the fluid conduit. While these components (e.g., shafts) may not significantly affect the backpressure or fluid flow rate when the valve is partially closed, because the valve position can be adjusted to compensate for such conditions, the components can significantly affect the backpressure or fluid flow rate when the valve is fully opened.

Additionally, when used to regulate gaseous or pressurized fluid, the torque required to actuate conventional fluid valves can be sensitive to the pressure of the fluid. For example, at higher fluid pressures, more torque is required to maintain a position of conventional fluid valves and/or actuate a conventional fluid valve into a new position. Additionally, at higher pressures, the ability to accurately control the position of conventional fluid valves is degraded. Moreover, conventional fluid valves tend to result in an increase in the seating velocity of the valve when sealed, which tends to increase the impact loads on the valve actuators.

Other conventional valves are used for regulating the flow of viscous fluids and materials, such as gravity-fed metering valves. While such conventional valves may be useful for flow regulation of viscous fluids and materials, they are not conducive to regulating the flow of substantially non-viscous, gaseous fluids, such as exhaust and air, because they do not adequately address fluctuating pressure and actuation torque concerns. Moreover, some conventional valves for regulating the flow of viscous fluids and materials

SUMMARY

The subject matter of the present application has been developed in response to the present state of the art, and in particular, in response to the problems and needs of fluid valves that have not yet been fully solved by currently available fluid valves. Accordingly, the subject matter of the present application has been developed to provide a fluid valve that overcomes at least some of the above-discussed shortcomings of conventional fluid valves.

According to one embodiment, a fluid valve assembly includes a body that defines a fluid cavity. The body includes an inlet through which fluid enters the fluid cavity and an outlet from which fluid exits the fluid cavity. The fluid valve assembly includes at least one arm rotatably coupled to the body and positioned within the fluid cavity. Additionally, the fluid valve assembly includes a flap coupled to the at least one arm. The flap includes a domed portion and a flat portion extending radially outwardly away from the domed portion. The flap can have a thin-walled construction. For example, the flap can have a thickness-to-width ratio of less than about 0.05. According to several implementations, the fluid valve assembly can further include a fluid flow straightener positioned within the fluid cavity.

In some implementations, the at least one arm is rotatable to position the flap in a fully closed position that prevents fluid flow through the outlet. In the fully closed position, the flap covers the inlet. The domed portion can include a concave surface and an opposing convex surface such that when in the fully closed position the concave surface faces the inlet. In certain implementations, in the fully closed position the convex surface faces the inlet. In certain implementations, in the fully closed position, the flap covers the outlet.

According to some implementations, the at least one arm includes two spaced-apart arms each coupled to the body and positioned within the fluid cavity. The two spaced-apart arms are secured to opposing sides of an outer periphery of the flap. The at least one arm can be positioned directly adjacent a sidewall of the body. A ratio of a length of the at least one arm to a diameter of one of the inlet and outlet can be at least about 0.5.

In certain implementations, the fluid valve assembly includes an annular sealing member positioned within the fluid cavity. In the fully closed position, the flap bends the annular sealing member in a direction parallel to a flow direction of fluid into the inlet. The annular sealing member can include a fixed portion fixed relative to the body and a movable portion that is movable relative to the body. The fluid valve assembly may further include a retention member positioned within the fluid cavity. The retention member can include a first portion pressed against the fixed portion and a second portion spaced apart from the movable portion. The flap can engage the movable portion to move the movable portion relative to the body as the flap rotates into a fully closed position.

According to another embodiment, a fluid flow regulating system includes a fluid inlet conduit directing a pressurized gaseous fluid in a fluid flow direction, and a fluid outlet conduit capable of directing the pressurized gaseous fluid in the fluid flow direction. The system further includes a fluid valve assembly that includes a body with an inlet in fluid receiving communication with the fluid inlet conduit and an outlet capable of being in fluid providing communication with the fluid outlet conduit. The fluid valve assembly further includes a flap that is movable between a fully open position allowing fluid from the fluid inlet conduit to flow into the fluid outlet conduit and a fully closed position preventing fluid from the fluid inlet conduit from flowing into the fluid outlet conduit. The flap includes a dome and an annular lip encircling the dome.

In some implementations of the system, the dome includes a concave surface and an opposing convex surface. In the fully closed position, the fluid from the fluid inlet flows into the concave surface. The fluid valve assembly of the system can be one of an air intake valve assembly, exhaust throttle valve assembly, turbocharger bypass valve assembly, and exhaust gas recirculation valve assembly.

According to some implementations, the fluid valve assembly of the system includes a resiliently flexible annular sealing member positioned within the body. As the flap moves into the fully closed position, the flap can move a portion of the flexible annular sealing member relative to the body in a direction approximately parallel to the fluid flow direction. Another portion of the flexible annular sealing member can be fixed relative to the body as the flap moves into the fully closed position.

In yet another embodiment, an apparatus includes a body defining a fluid cavity. The body includes an inlet through which fluid enters the fluid cavity and an outlet from which fluid exits the fluid cavity. The apparatus also includes a pair of spaced-apart arms positioned within the fluid cavity and closely coupled to sidewalls of the body. The spaced-apart arms are rotatable within the fluid cavity between a fully open position and a fully closed position. The apparatus further includes a flap secured between the spaced-apart arms and movable with the spaced-apart arms between the fully open position and the fully closed position. In the fully closed position, the flap prevents the passage of fluid through the outlet. The flap includes a concave surface facing the inlet in the fully closed position, a convex surface facing the outlet in the fully closed position, and an annular lip extending about a periphery of the flap. Additionally, the apparatus includes an annular sealing member positioned within the body. As the flap moves into the fully closed position, the flap engages and moves an entire cross-section of the annular sealing member along the body to seal the annular sealing member against the flap.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
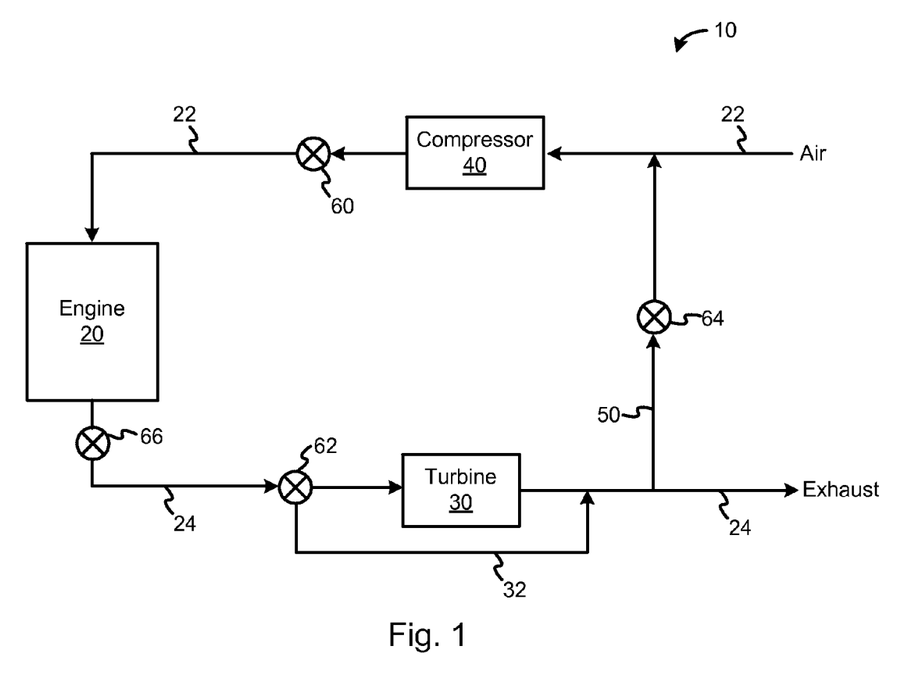
FIG. 1 is a schematic block diagram of an engine system with a plurality of fluid valves according to one embodiment.

Referring to FIG. 1, one embodiment of an internal combustion engine system 10 includes an internal combustion engine 20, a turbine 30 of a turbocharger, a compressor 40 of a turbocharger, and an EGR line 50. The internal combustion engine 10 can be a compression-ignited internal combustion engine, such as a diesel fueled engine, or a spark-ignited internal combustion engine, such as a gasoline fueled engine. Generally, the internal combustion engine combusts fuel in the presence of air within one or more combustion chambers. Although not shown, the engine system 10 includes a fuel source configured to provide fuel for combustion to the engine. The engine system 10 also includes an air intake system that includes an air intake line 22 that places the engine 20 in air receiving communication with an air source (e.g., atmospheric air). The quantity or flow rate of air into the engine 20 can be controlled by actuation of an air intake valve 60 positioned in the air intake line 22. Combustion of the fuel and air in the combustion chamber produces exhaust gas that is operatively vented to an exhaust line 24. The quantity or flow rate of exhaust gas through the exhaust line 24 can be regulated by an exhaust throttle valve 66 positioned in the exhaust line downstream of the engine 20.

Although not necessary, in some embodiments, the engine system 10 includes a turbocharger powered by a portion of the exhaust gas generated by the engine 20. The turbocharger includes the turbine 30 that is co-rotably coupled with the compressor 40. The exhaust gas is used to directly power (e.g., drive or spin) the turbocharger turbine 30, which drives the turbocharger compressor 40 via the co-rotatable connection. The compressor 40 is configured to compress at least some of the air flowing through the air intake line 22 before directing the compressed air to the engine 20. As shown, in some implementations, the system 10 includes a turbine bypass valve 62, which can be a type of diverter valve that regulates the flow of exhaust gas from one conduit into multiple conduits. The turbine bypass valve 62 can be actuated to regulate the quantity or flow rate of exhaust gas through the turbine 30 and around the turbine.

For the purposes of altering the combustion properties of the engine 20, a portion of the exhaust gas in the exhaust gas line 24 may be re-circulated back to the engine 20 via an exhaust gas recirculation (EGR) line 50. As shown, the EGR line 50 is operable to fluidly couple the exhaust line 24 with the air intake line 22 such that the re-circulated exhaust gas is added to the air in the air intake line prior to entering the engine 20. The quantity or flow rate of exhaust gas entering the EGR line 50 and added to the air intake line 22 is controlled by actuation of an EGR valve 64 positioned in the EGR line (alternatively, the EGR valve 64 can be a diverter valve positioned at the intersection of the exhaust line 24 and EGR line. Generally, the EGR valve 64 is actuated according to an EGR control signal to divert a requested amount of exhaust gas back to the engine. The requested amount of exhaust gas is determined and the EGR control signal is generated by a controller (not shown). The portion of the exhaust gas which is not re-circulated to the engine 20 via the EGR line 50 is destined for expulsion from the engine system 10 into the atmosphere via the exhaust line 24. Although in the illustrated embodiment, the EGR line 50 is a low-pressure EGR line positioned downstream of the turbine 30, in other embodiments, the EGR line can be a high-pressure EGR line positioned upstream of the turbine. Accordingly, in some embodiments, the EGR line 50 can bypass the turbine 30.

One or more of the valves 60, 62, 64, 66 of the engine system 10 can be configured according to a fluid valve assembly as described herein. Moreover, the engine system 10 can include other fluid valves not shown that may also be configured according to the fluid valve assembly described herein. According to one embodiment shown in FIGS. 2-7, a fluid valve assembly 110 regulates the flow of a fluid indicated generally by directional arrow 112 from one conduit or pipe 190 into another conduit or pipe 192. Although not shown, the valve assembly 110 (which is shown as a straight-flow valve) may be configured to further regulate the flow of fluid from the conduit 190 into the conduit 192 and another one or more conduits (not shown) to function as a diverter-type valve. The sealing assembly for a diverter-type valve would function in the same or similar manner as the straight-flow valve as will be described below, except perhaps the diverter-type valve may have dual sealing assemblies for dual inputs or dual outputs as desired. Although the fluid valve assembly 110 may be operable to regulate the flow of non-pressurized, viscous fluids or materials in industrial applications (such as gravity-fed applications), the fluid valve assembly 110 is particularly suited for regulating the flow of variably pressurized, relatively non-viscous, gaseous fluids in automotive, aeronautical, and other applications.

Figure 2:
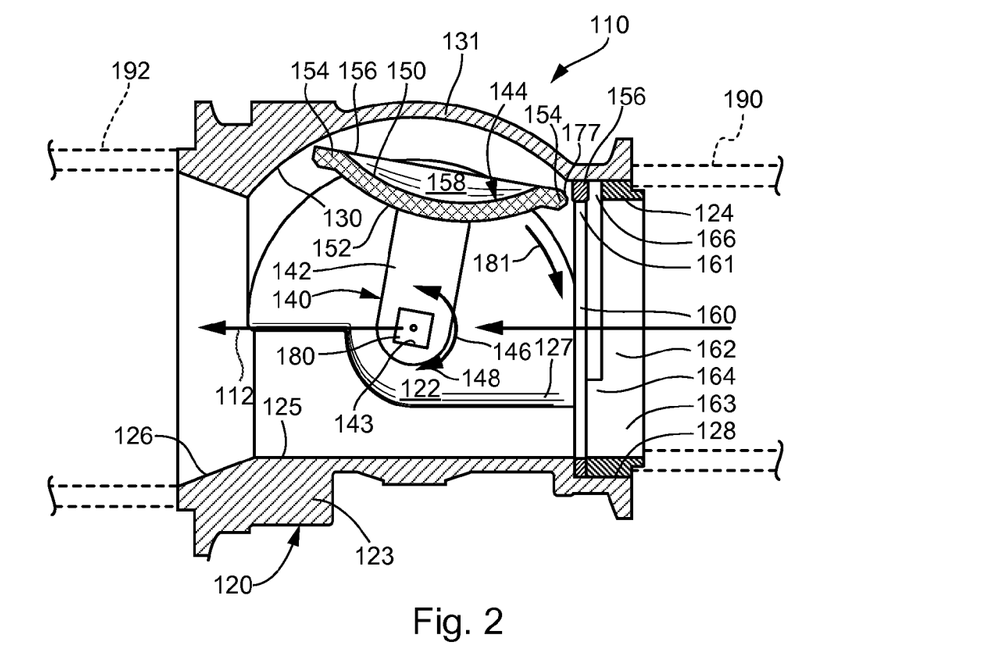
FIG. 2 is a cross-sectional side view of a fluid valve assembly with a flap element in a fully open position according to one embodiment.

The fluid valve assembly 110 includes a valve body 120 that defines a fluid cavity 122 through which the fluid 112 is flowable when a flap element 140 of the fluid valve assembly is in a fully opened or partially opened position. The valve body 120 includes a bottom wall 123, top wall 131, and sidewalls 132 (see, e.g., FIG. 5) extending between the bottom and top walls. The interior surfaces of the walls 123, 130, 132 define the fluid cavity 122, including a first open end 124 and a second open end 126 of the fluid cavity. Depending on the direction of fluid flow, the first open end 124 can be one of an inlet and outlet end of the fluid cavity 122, and the second open end 126 can be the other of the inlet and outlet end of the fluid cavity. In the illustrated embodiment, the first open end 124 is the inlet end and the second open end 126 is the outlet end of the fluid cavity 122. The bottom wall 123 defines a substantially arcuate interior bottom surface 125 of the fluid cavity 122 that effectively curves about or extends parallel to a central axis of the fluid cavity. The arcuate interior surface 125 can be configured to correspond to the arcuate configuration of the fluid channels defined by the conduits 190, 192. The top wall 131 also may define an arcuate interior top surface 30 of the fluid cavity 122, but the arcuate interior surface 130 curves about an axis that is perpendicular to the central axis of the fluid cavity. The arcuate interior surface 130 facilitates the implementation of a small clearance between the surface 130 and a flap 144 of the flap element 140 as the flap element actuates between fully open, fully closed, and intermediate positions.

The fluid cavity 122 of the valve assembly 110 is configured to accommodate the features of the flap element 140. For example, the bottom wall 123 of the valve body 120 includes angled steps 127 extending between the bottom surface 125 and respective interior surfaces defined by the side walls 132. The angled steps 127 are configured to provide spacing for respective arms 142 of the flap element 140. Additionally, the bottom wall 123 of the valve body 120 may include a lip 128 proximate the first open end 124 to accommodate the placement and retention of a sealing member 60 and retention member 62 within the fluid cavity 122. The lip 128 extends about only a portion (e.g., bottom portion) of the circumference of the fluid cavity 122.

Figure 7:
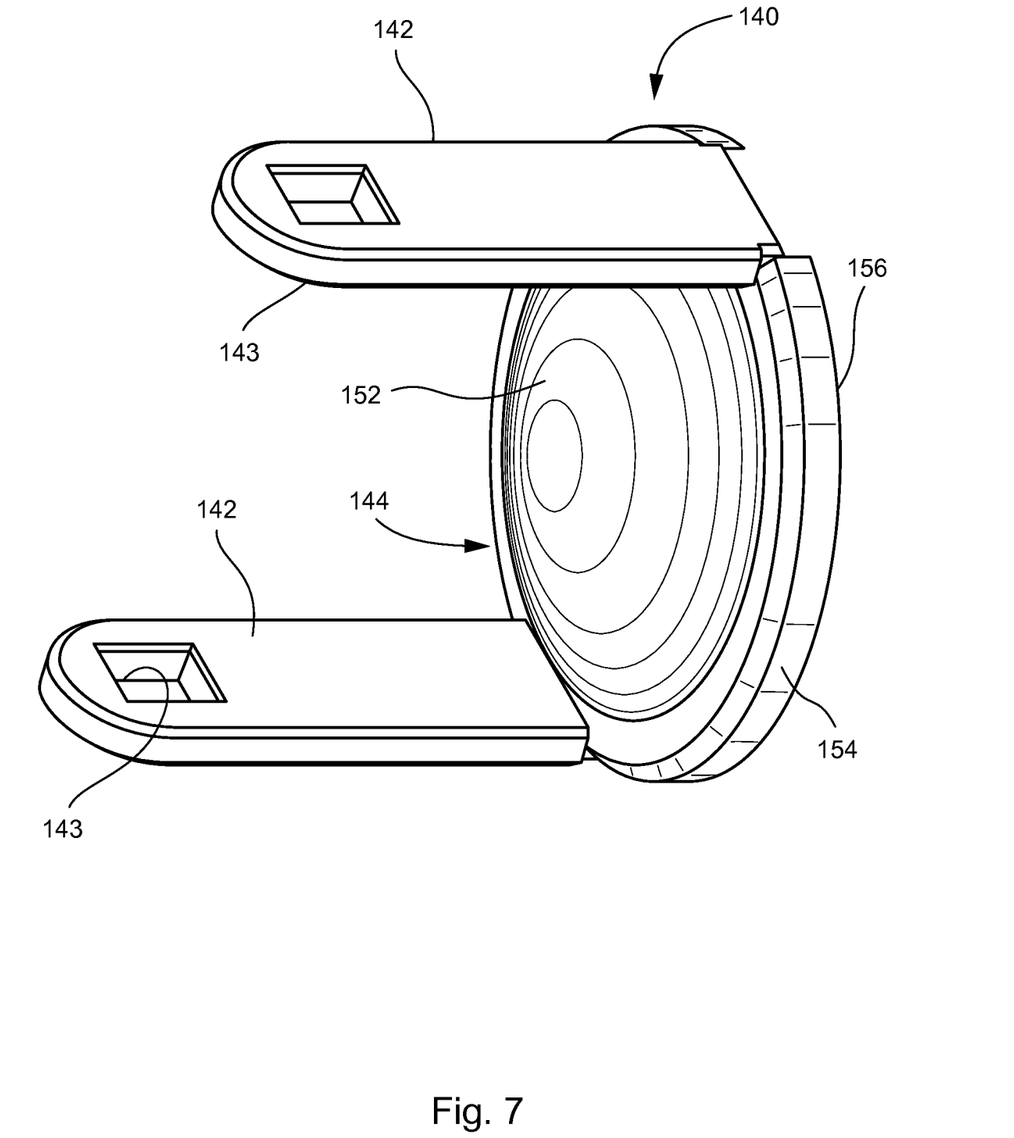
FIG. 7 is a perspective view of a flap element of a valve assembly according to one embodiment.

The flap element 140 includes the flap 144 and a pair of arms 142 secured to the flap 144. In one implementation, the flap 144 can be described as having a substantially thin-walled, partially-domed shape or being a partially-domed disk. Alternatively, the flap 144 can be described as having a substantially thin-wall or a thin-walled construction, partially-spherical shape or being a partially-spherical disk. The flap 144 includes a domed portion 153 and flat portion 154 (e.g., outer lip or flange) encircling the domed portion 153 and extending radially outwardly from the domed portion.

The domed portion 153 defines a concave surface 150 and an opposing convex surface 152. Depending on the direction of the fluid 112, the concave surface 150 can be defined as one of an upstream-facing surface or a downstream-facing surface, and the convex surface 152 can be defined as the other of the upstream-facing surface and downstream-facing surface. In the illustrated embodiment of FIGS. 2-7, the concave surface 150 is an upstream-facing surface, and the convex surface 152 is a downstream-facing surface. In contrast, in the illustrated embodiment of FIG. 8, the concave surface of the flap is a downstream-facing surface, and the convex surface of the flap is an upstream-facing surface.

The flat portion or flange 154 defines a substantially planar or flat leading surface 156 of the flap 144. Moreover, the flange 154 is substantially annular shaped and defines a substantially circular outer periphery 145 of the flap 144. A diameter of the outer periphery 145 corresponds to an inner diameter of one of the conduits 190, 192, and or a width of the fluid cavity 122 defined between the sidewalls 132 of the fluid cavity. In one embodiment, a ratio of the radius of the domed portion of the flap 144 (e.g., radius of curvature) to the inner diameter of one of the conduits 190, 192 is greater than or equal to about 0.5.

The minimum distance between the concave and convex surfaces 150, 152 defines a thickness of the domed portion 153, which is significantly smaller than a diameter of the domed portion. The flange 154 may have a thickness that is approximately equal to the thickness of the domed portions 153. According, the maximum thickness of the flap 144 is significantly smaller than a diameter of the flap (e.g., diameter of outer periphery 145. In certain implementations, for example, the thickness of the flap 144 is between about 2 mm and about 12 mm depending on the application and materials. The spherical shape of the flap 144 promotes lower flow torque, which leads to a reduction in the actuation torque required to actuate the flap in the presence of a pressurized fluid flow. Additionally, the spherical shape of the flap 144, as well as the associated higher inertia of the flap 144, also promotes more precise control of the actuation and position of the flap in the presence of the pressurized fluid, which can be defined as a fluid having a pressure greater than atmospheric or ambient pressure.

The arms 142 of the flap element 140 are spaced apart with first end portions fixedly coupled to the flap 144 on opposite sides of the flap at the outer periphery 145 of the flap. In the illustrated embodiment, the first end portions of the arms 142 are fixed to indentations formed in the flange 154 of the flap. The first end portions can be fixed to the flap 144 using any of various techniques, such as welding, fastening, and the like. Second end portions of the arms 142 opposite the first end portions include respective apertures 143. In some implementations, the apertures 143 are non-circular. In the illustrated implementation, the apertures 143 are square-shaped. Like the flap 144, each arm 142 has a significantly small thickness-to-length ratio. In other words, the arms 142 have a small thickness to reduce the overall weight or mass of the flap element 140. The length of the arms 142 (more specifically, a distance between the apertures 143 and the flap 144) determines a swing radius of the flap element 140. In certain implementations, a ratio of the swing radius of the flap element 140 to a diameter of the conduits 190, 192 (which can be equal to the diameter of the inlet and/or outlet of the body) is greater than or equal to about 0.5, and in yet some implementations, the same ratio is greater than or equal to about 0.67.

The second end portion of each arm 142 is rotatably coupled to a respective one of the sidewalls 132. A distance between the arms 142 may be approximately equal to the width of the fluid cavity. Accordingly, when positioned within the fluid cavity and coupled to the sidewalls 132, the arms 142 are in close proximity to (e.g., directly adjacent) the corresponding sidewalls (see, e.g., FIGS. 5 and 6). Moreover, as mentioned above, the thickness of the arms 142 are relatively small compared to the length. Accordingly, due to the close proximity of the arms 142 relative to the sidewalls 132 and the thinness of the arms, the arms do not present a substantial obstacle or impedance to the flow of fluid 112 through the fluid cavity 122, particularly when the flap element 140 is in a fully open position as shown in FIG. 2.

Figure 5:
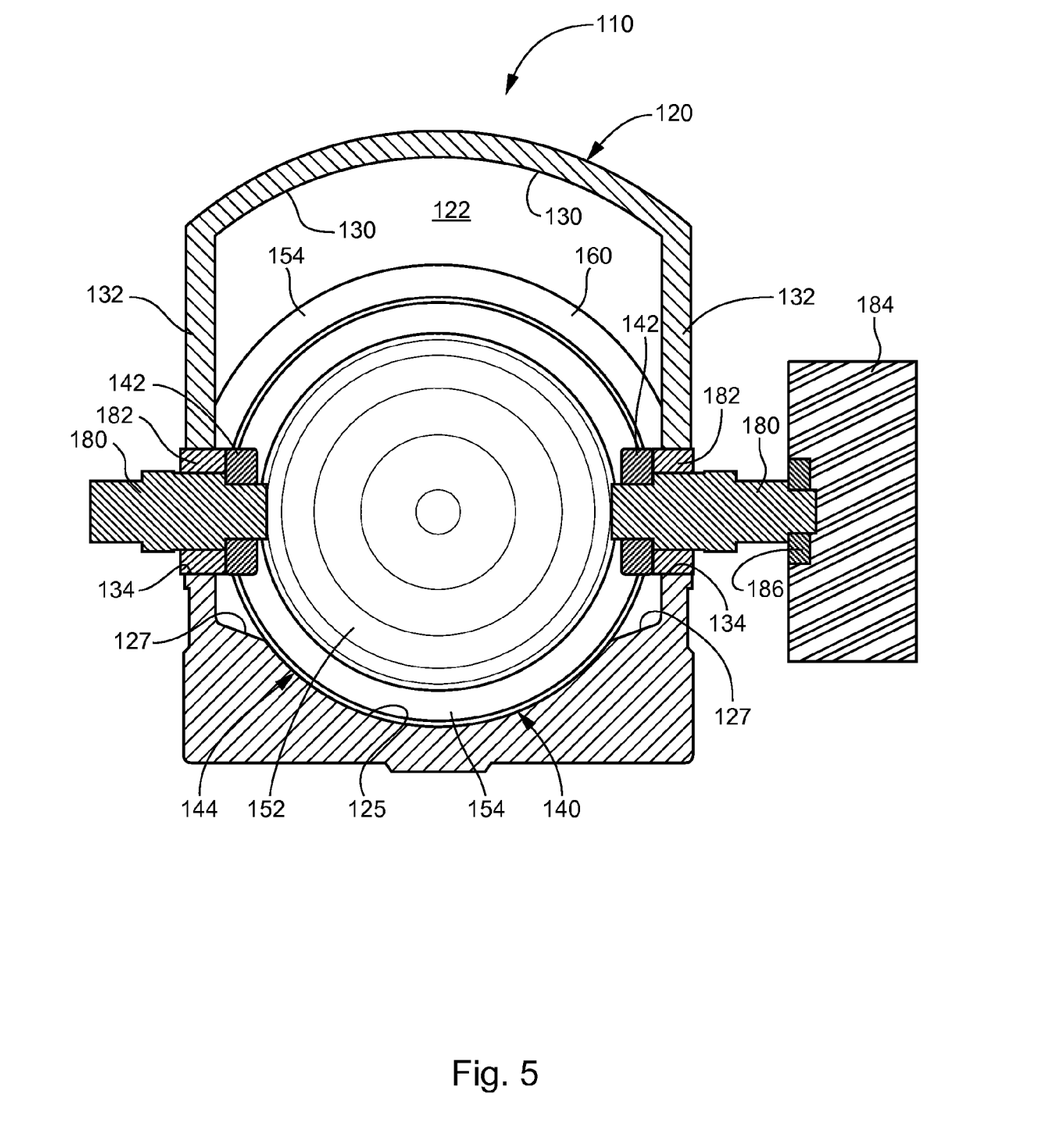
FIG. 5 is a cross-sectional upstream view of the fluid valve assembly of FIG. 2 with the flap element in the fully closed position according to one embodiment.
Figure 6:
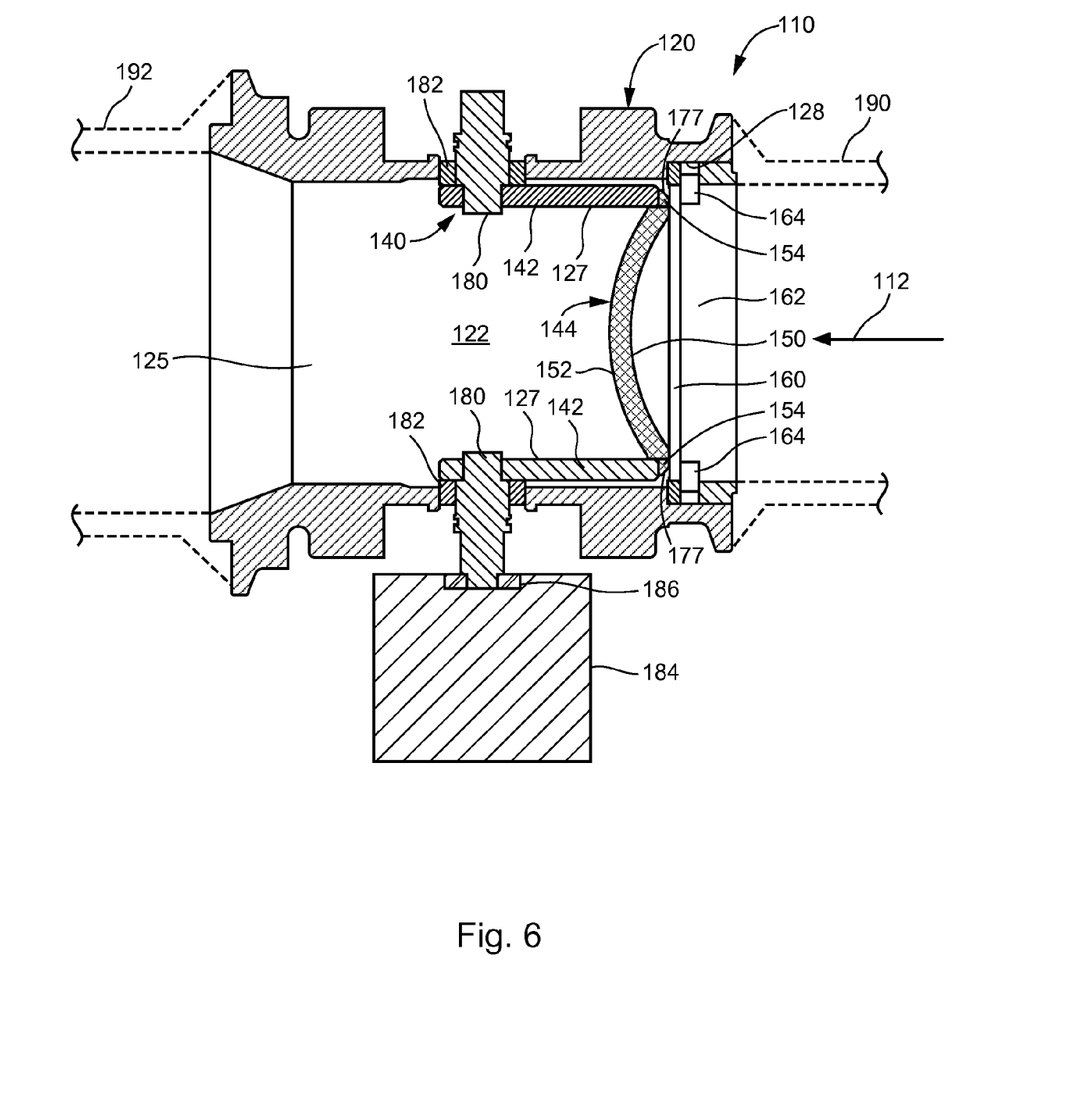
FIG. 6 is a cross-sectional top view of the fluid valve assembly of FIG. 2 with the flap element in the fully closed position according to one embodiment.

The arms 142 may be rotatably coupled to the sidewalls 132 using any of various techniques. According to one embodiment, as shown in FIGS. 5 and 6, the fluid valve assembly 110 includes a pair of shafts 180 extending through respective apertures 134 formed in the sidewalls 132 of the valve body 120. The shafts 180 are rotatable within the apertures 134. Reduced frictional rotation of the shafts 180 within the apertures 134 can be facilitated by bearings 182 positioned within the apertures between the shafts and the sidewalls 32. Co-rotation of the shafts relative to the arms 142 is accomplished by inserting non-round (e.g., square) interior ends of the shafts 180 into the non-round (e.g., square) apertures 143 formed in the arms. The non-round interior ends of the shafts 180 can be fixed to the arms 142 within the apertures 143 via a press-fit connection between the interior ends and the apertures, or other technique, such as welding, fastening, and the like. Exterior ends of the shafts 180 external to the fluid cavity 122 can be coupled to any of various structures secured relative to the valve body 120. As shown, the exterior end of one of the shafts 180 is coupled to and driven by a driving device 184, such as an electric, magnetic, and/or hydraulic motor. The valve assembly 110 may include a coupler 186 that couples the exterior end of the shaft 180 to an output of the driving device 184.

The driving device 184 is operable to rotate the shaft 180 to which it is coupled based on commands received from a controller, such as an electronic control module. Rotation of the shaft 180 correspondingly rotates the arm 143 co-rotatably fixed to the shaft. Because the arm 142 is fixed to the flap 144, which is fixed to the opposing arm 142, rotation of the shaft 180 by the driving device 184 correspondingly rotates both arms 142 and the flap 144. As shown, the driving device 184 is actuatable to rotate the arms 142 about a pivot axis 146 concentric with the shafts 180 as indicated by directional arrows 148. As the arms 142 rotate, the flap 144 also rotates about the pivot axis 146 as indicated by directional arrows 181 (see, e.g., FIG. 2) and directional arrows 183 (see, e.g., FIG. 3).

Figure 3:
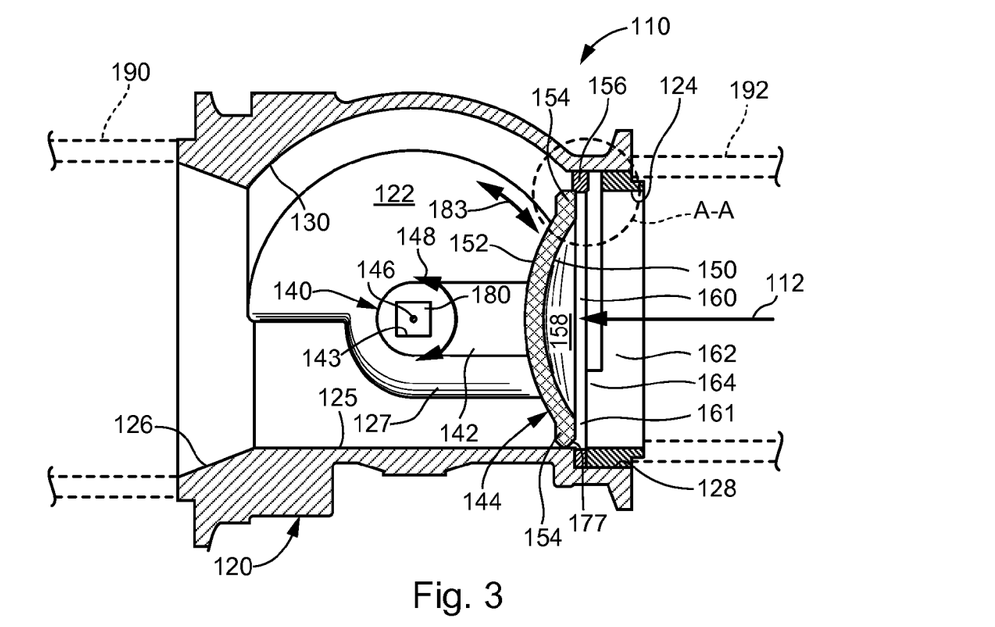
FIG. 3 is a cross-sectional side view of the fluid valve assembly of FIG. 2 with the flap element in the fully closed position according to one embodiment.

Generally, the driving device 184 is operable to rotate the flap element 140 into any of an infinite number of positions between, and including, a fully open position as shown in FIG. 2, for example, and a fully closed position as shown in FIG. 3, for example. In the fully open position, the flap 144 is positioned within a section of the fluid cavity 122 defined by the arcuate upper surface 30 of the body 120. With the flap 144 in this position, no portion of the flap obstructs the flow of fluid 112 from the upstream conduit 190, through the fluid cavity 122, and into downstream conduit 192. Moreover, in this position, as described above, the low profile of the arms 142 only minimally obstruct the flow of fluid 112 through the fluid cavity 122. From the fully open position, the flap element 140 rotates in the direction 181. As the flap element 140 rotates from the fully open position toward the fully closed position, the concave surface 50 of the flap 144 begins to impede or obstruct the flow of fluid 112 through the fluid cavity 122. The severity of the obstruction increases as the flap element 140 rotates in the direction 181 until the flap element is positioned in the closed position, where the flap 144 completely obstructs or blocks the flow of fluid 112 into the fluid cavity 122. Similarly, as the flap element 140 rotates from the fully closed position toward the fully open position in the direction 183, the severity of the obstruction decreases until the flap element is positioned in the open position, where the flap 144 minimally obstructs or blocks the flow of fluid 112 into the fluid cavity 122. Basically, the more severe the obstruction the lower the quantity of fluid 112 flowing through the fluid cavity 122, and the less severe the obstruction, the higher the quantity of fluid 112 flowing through the fluid cavity. In this manner, the valve assembly 120 can regulate the flow of fluid from one conduit into another conduit or conduits.

In contrast to conventional valves, the torque input from the driving device 184 required to rotate the flap element 140 between the fully open and fully closed positions does not significantly change as the flap element 140 is rotated. With typical flat-faced fluid valves, the angle of the valve impacted by pressurized, gaseous fluid results in an uneven distribution of pressure on the valve, which changes with a change in the angle of the valve. Uneven pressure distributions or concentrations on the valve increases the amount of torque required to move the valve. The spherical nature of the flap 144 mitigates uneven pressure distributions on the flap because the surface normal of a spherical shape always converge on a single point, and thus effectively cancel out each other. Accordingly, the configuration of the flap 144 reduces the actuation torque required to rotate the flap element 140 between the fully open and fully closed positions.

The fluid valve assembly 110 also seals the flap 144 when in the closed position to reduce undesirable fluid leaks from the conduit 190 into the fluid cavity 122. Additionally, the sealing arrangement of the fluid valve assembly 110 reduces the seating velocity of the flap 144 when sealed, which reduces the impact loads on the valve actuators (e.g., the driving device 184). The sealing arrangement of the valve assembly 110 includes a sealing member 160 positioned within the fluid cavity and supported on the lip 128. The sealing member 160 is an annular ring-like element made from a resilient, deformable material, such as rubber or other elastomeric material. The sealing member 160 defines an inner aperture 161. In some implementations, the inner aperture 161 is circular with a constant diameter approximately equal to, or just smaller than, a diameter of the conduit 190 and an inner aperture 163 of the retention member 62. The sealing member 160 has a substantially circular outer perimeter with a diameter substantially equal to a diameter of the fluid cavity 122 at the portion of the first open end 124 that includes the lip 128. In view of this configuration of the sealing member 160, the sealing member can be seated within the fluid cavity 122 on the lip 128 such that the outer periphery of the sealing member contacts the interior surface of the fluid cavity. However, because the lip 128 extends about only a portion of the circumference of the fluid cavity 122, a bottom portion of the inner aperture 161 of sealing member 160 is flush with the bottom surface 125 of the fluid cavity, and middle and upper portions of the inner aperture of the sealing member are positioned radially inward of the sidewall surfaces and upper surface 130 of the fluid cavity.

The sealing member 160 is retained in placed on the lip 128 by the retention member 162. The retention member 162 has a substantially annular shape with an inner diameter corresponding with the inner diameter of the sealing member. Like the sealing member 160, the retention member 162 also has a substantially circular outer perimeter with a diameter substantially equal to a diameter of the fluid cavity 122 at the portion of the first open end 124 that includes the lip 128. The retention member 162 can be seated within the fluid cavity 122 on the lip 128 such that the outer periphery of the retention member contacts the interior surface of the fluid cavity in a manner similar to the sealing member 160. The retention member 162 can be press-fit against the interior surface of the fluid cavity 122, and held in place by an adjoining conduit, such as fluid conduit 190, and a clamp. In some implementations, the retention member 162 is made from a relatively non-resilient, non-deformable material, such as a metal or hardened plastic.

The retention member 162 also includes a semi-annular step or extension 164 at a bottom portion of the retention member. The semi-annular step 164 is positioned about and supported on the lip 128. Generally, an axial length of the retention member 162 is longer along the step 164 than the remaining portions of the retention member 162. The sealing member 160 is retained in place by pressing the step 164 of the retention member 162 against sealing member to effectively press bottom portion of the sealing member 160 against the edge of the lip 128. In this manner, a bottom portion of the sealing member 160 is axially immovably retained in place on the lip 128 by the step 164 of the retention member 162. However, because the step 164 extends about only a bottom portion of the retention member, a space or gap 166 exists between the retention member 162 and the sealing member 160 at the top and middle portions of the sealing member.

As shown in FIG. 3, when the flap element 140 is in the fully closed position, a portion of the outer periphery 145 of the flap 144 contacts the bottom surface 125 of the body 120, which can be curved to match the circular periphery of the flap. In this manner, a bottom portion of the flap 144 forms a seal against the bottom surface 125 of the body 120 to restrict the flow of fluid 112 between the flap and bottom surface of the body. However, as shown, with the flap element 140 in the fully closed position, the middle and top portions of outer periphery 145 of the flap 144 are spaced radially away from the interior surfaces of the body 120 and do not form a seal against the corresponding interior surfaces. Accordingly, in the fully closed position, the flap 144 contacts the sealing member 160 and forms a seal against the sealing member to restrict the flow of fluid 112 between the flap and sealing member.

Figure 4:
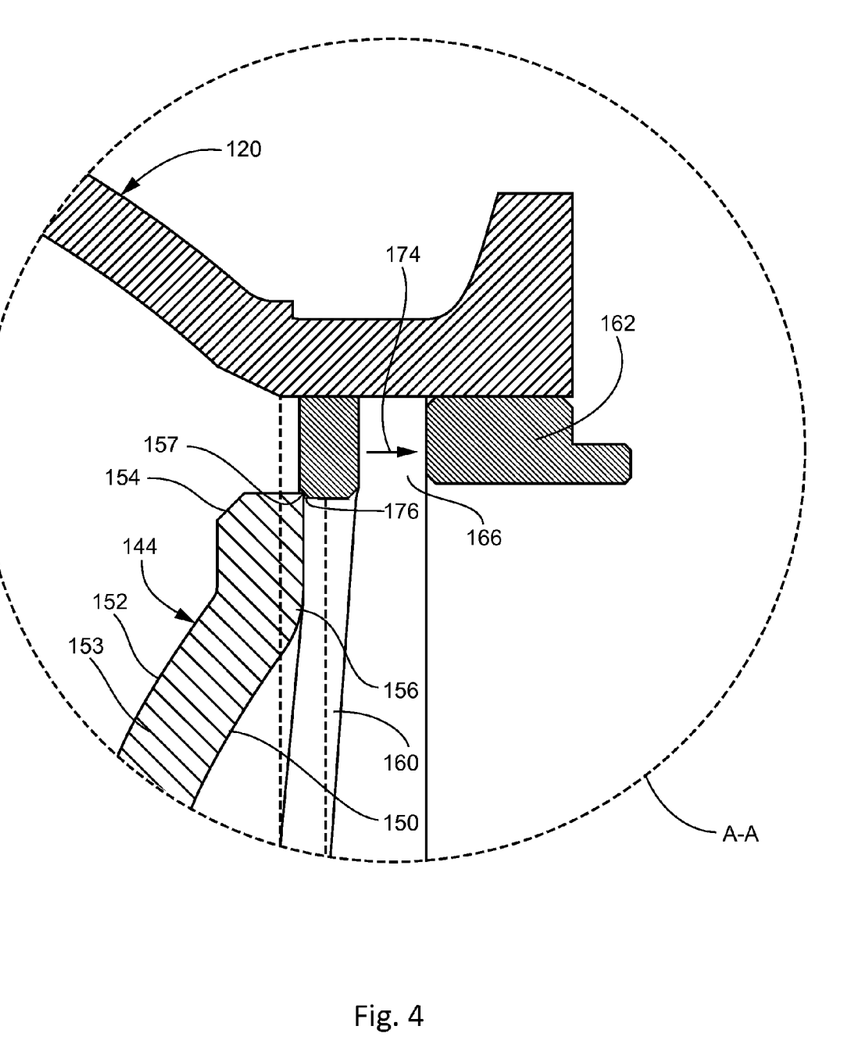
FIG. 4 is a cross-sectional side view of a detailed section of the fluid valve assembly of FIG. 2 with the flap element in the fully closed position.

Referring to FIG. 4, as the flap 144 rotates into the fully closed position, an edge 157 of the lip 154 of the flap at the middle portions and upper portion of the flap contacts the sealing member 160 at corresponding portions (e.g., middle and upper) of the sealing member. Because these portions of the sealing member 160 are not axially fixed by the retention member, and the sealing member is made from a flexible material, as the flap 144 contacts the sealing member, the sealing member flexes or bends in the direction 174 into the gap 166. More specifically, while the edge 157 may partially or initially deform the sealing member 160, the flap 144 acts to move the entire movable portion of the sealing member (e.g., slide the sealing member along the interior surface of the body). The movable portion can be more than half of the sealing member 160, and can include an entire cross-section of the sealing member.

With a portion of the sealing member fixed relative to the body, moving the sealing member 160 in this manner requires a moment of deflection or bending about a location on the sealing member proximate the fixed portion of the sealing member. Further, because the sealing member 160 is made from a resilient material, the sealing member applies a biasing force against the sealing member in a direction opposing the direction 174. The biasing force helps to strengthen the seal formed between the sealing member 160 and lip 154 of the flap 144. To promote proper engagement with the sealing member 160 and movement in the direction 174, the sealing member may include a chamfered edge 176 configured to receive the edge 157 of the lip 154 of the flap 144. The chamfered edge 176 may extend around only a portion (e.g., 180-degrees) of the sealing member 160. In some embodiments, the chamfer is formed into the edge 157 of the flap 144, and the edge 176 of the sealing member 160 is pointed or unchamfered. The seal between the sealing member 160 and lip 154 of the flap 140 is further strengthened by the downstream directed pressure of the fluid 112 in the upstream conduit 190 acting on the sealing member. The pressure of the fluid 112 urges the sealing member 160 in the downstream direction against the lip 154, which promotes the seal between the sealing member and lip.

As shown, in some embodiments, a leading edge of the flap 144 can be chamfered to form a chamfered edge 177. The chamfered edge 177 can extend around only a portion (e.g., less than half) of the circumference of the flap 144. The chamfered edge 177 in the leading edge of the flap 144 allows the flap to rotate between the open and closed positioned without the leading edge engaging the sealing member 60. In other words, the chamfered edge 177 provides a clearance between the leading edge of the flap 144 and the chamfered edge 176 of the sealing member 160. The chamfered edge 177 can be uniformly sized and shaped along the periphery of the flap 144, or variably sized and shaped along the periphery of the flap 144.

Figure 8:
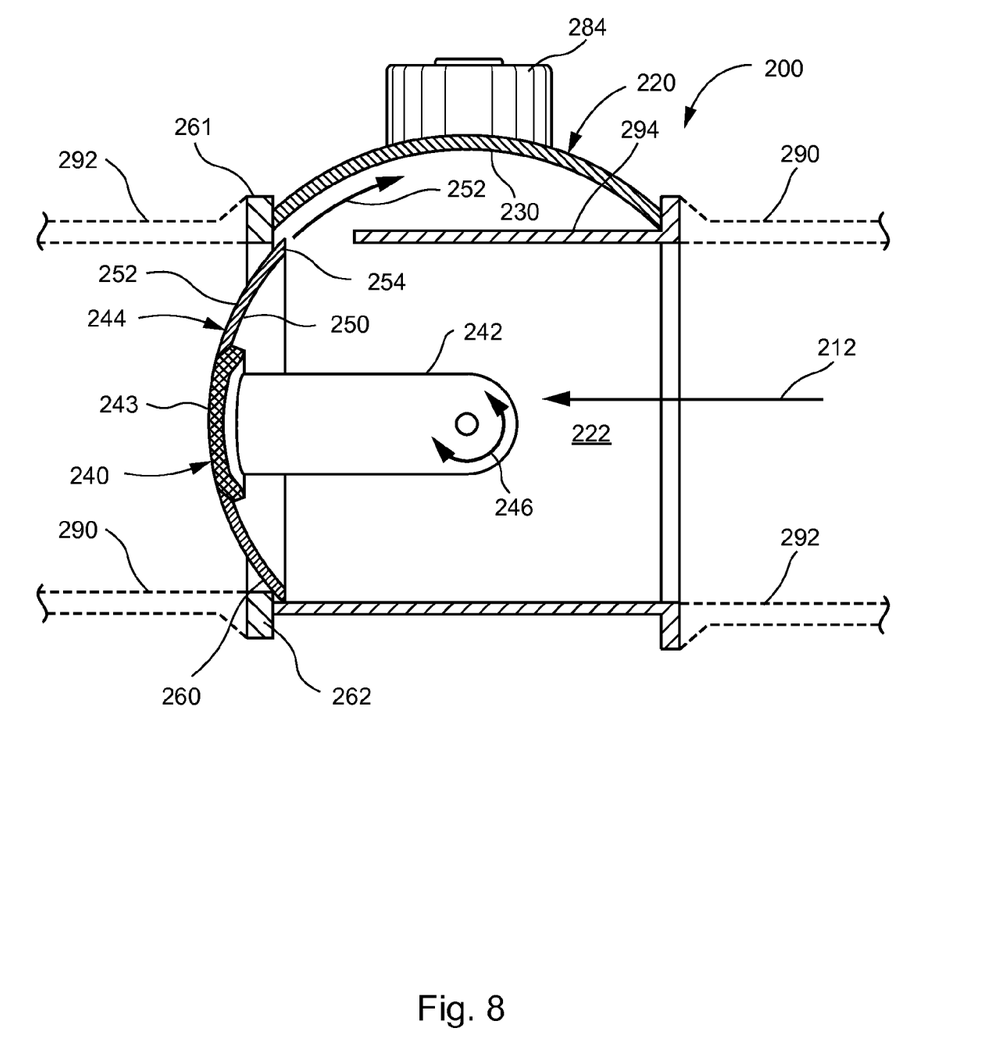
FIG. 8 is a cross-sectional side view of a fluid valve assembly with a flap element in a fully closed position according to one embodiment.

According to another embodiment shown in FIG. 8, a fluid valve assembly 200 includes some features similar to the features of the fluid valve assembly 100, with like numbers referring to like elements. However, as will be emphasized in the following description, the fluid valve assembly 200 includes some differences in comparison to the fluid valve assembly 100. For example, although the fluid valve assembly 200 includes a flap element 240 with a thin-walled flap 244 that has a concave surface 250 and opposing convex surface 252, the concave surface faces the oncoming fluid 212 when the flap element is in the fully closed position as shown. Similar to the concave surface 152, which faces the oncoming fluid 112, the spherical nature of the concave surface 250 mitigates uneven pressure distributions on the flap because the surface normal of a spherical shape always converge on a single point (e.g., the axis of rotation 256, and thus effectively cancel out each other. Additionally, when in the fully closed position, the flap 244 covers an outlet end of the fluid cavity 222, as opposed to an inlet end of the fluid cavity as with fluid valve 100. Alternatively, the fluid valve assembly 200 can be configured such that the flap 244 covers the inlet end of the fluid cavity 222, and the fluid valve assembly 100 can be configured such that the flap 144 covers the outlet end of the fluid cavity 122.

The arms 242 of the flap element 240 are coupled together by an extension member 243 that extends across the concave surface 250 of the flap 244. The extension member 243 includes a central plug that is positioned within a central aperture formed in the flap 244. The central plug can be secured to the central aperture to secure the extension member 243 and arms 242 to the flap 244. The flap 244 similarly includes a flat outer lip or flap 254 that engages a sealing member 260 retained in place via a first retention member 262 and second retention member 263.

The fluid valve assembly 200 also includes a flow straightener 294 positioned within the fluid cavity 222 of the body 220. The flow straightener 294 helps direct fluid 212 from an upstream conduit 290, around an upper pocket of the fluid cavity 222 defined by an upper arcuate interior surface 230 of the body 220, and toward a downstream conduit 292.

Although the concave surfaces 150, 250 of the flaps 144, 244 both face an upstream direction when in the fully closed position, in some embodiments, the flap orientation can be reversed such that the convex surfaces 152, 252 face the upstream direction as desired without departing from the essence of the present disclosure.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fluid valve assembly, comprising:
a body defining a fluid cavity, wherein the body comprises an inlet through which fluid enters the fluid cavity and an outlet from which fluid exits the fluid cavity;
at least one arm rotatably coupled to the body and positioned within the fluid cavity;
a flap coupled to the at least one arm, the flap comprising a domed portion and a flat portion extending radially outwardly away from the domed portion;
an annular sealing member positioned within the fluid cavity, the annular sealing member comprising a fixed portion fixed relative to the body and a movable portion that is movable relative to the body; and
a retention member positioned within the fluid cavity, the retention member comprising a first portion having a semi-annular step pressed against the fixed portion to axially immovably retain the fixed portion relative to the body, and a second portion spaced apart from the movable portion, wherein the flap engages the movable portion to move the movable portion relative to the body as the flap rotates into a fully closed position.

2. The fluid valve assembly of claim 1, wherein the flap has a thin-walled construction.

3. The fluid valve assembly of claim 2, wherein the flap has thickness-to-width ratio of less than about 0.05.

4. The fluid valve assembly of claim 1, wherein the at least one arm is rotatable to position the flap in a fully closed position preventing fluid flow through the outlet, wherein in the fully closed position the flap covers the inlet.

5. The fluid valve assembly of claim 1, wherein the at least one arm is rotatable to position the flap in a fully closed position preventing fluid flow through the outlet, wherein in the fully closed position the flap covers the outlet.

6. The fluid valve assembly of claim 1, wherein the at least one arm is rotatable to position the flap in a fully closed position preventing fluid flow through the outlet, the domed portion comprising a concave surface and an opposing convex surface, and wherein in the fully closed position the concave surface faces the inlet.

7. The fluid valve assembly of claim 1, wherein the at least one arm is rotatable to position the flap in a fully closed position preventing fluid flow through the outlet, the domed portion comprising a concave surface and opposing convex surface, and wherein in the fully closed position the convex surface faces the inlet.

8. The fluid valve assembly of claim 1, wherein the at least one arm comprises two spaced-apart arms each coupled to the body and positioned within the fluid cavity, wherein the two spaced-apart arms are secured to opposing sides of an outer periphery of the flap.

9. The fluid valve assembly of claim 1, wherein the at least one arm is positioned directly adjacent a sidewall of the body.

10. The fluid valve assembly of claim 1, wherein a ratio of a length of the at least one arm to a diameter of one of the inlet and outlet is at least about 0.5.

11. The fluid valve assembly of claim 1, wherein the at least one arm is rotatable to position the flap in a fully closed position preventing fluid flow through the outlet, further comprising an annular sealing member positioned within the fluid cavity, wherein in the fully closed position the flap bends the annular sealing member in a direction parallel to a flow direction of fluid into the inlet.

12. The fluid valve assembly of claim 1, further comprising a fluid flow straightener positioned within the fluid cavity.

13. A fluid flow regulating system, comprising:
 a fluid inlet conduit directing a pressurized gaseous fluid in a fluid flow direction;
 a fluid outlet conduit capable of directing the pressurized gaseous fluid in the fluid flow direction; and
 a fluid valve assembly comprising:
  a body having an inlet in fluid receiving communication with the fluid inlet conduit and an outlet capable of being in fluid providing communication with the fluid outlet conduit,
  a flap that is movable between a fully open position allowing fluid from the fluid inlet conduit to flow into the fluid outlet conduit and a fully closed position preventing fluid from the fluid inlet conduit from flowing into the fluid outlet conduit, wherein the flap comprises a dome and an annular lip encircling the dome,
  an annular sealing member positioned within the body, the annular sealing member comprising a fixed portion fixed relative to the body and a movable portion that is movable relative to the body, and
  a retention member positioned within the body, the retention member comprising a first portion having a semi-annular step pressed against the fixed portion to axially immovably retain the fixed portion relative to the body, and a second portion spaced apart from the movable portion, wherein the flap engages the movable portion to move the movable portion relative to the body as the flap rotates into a fully closed position.

14. The fluid flow regulating system of claim 13, wherein the dome comprises a concave surface and an opposing convex surface, wherein in the fully closed position the fluid from the fluid inlet flows into the concave surface.

15. The fluid flow regulating system of claim 13, wherein as the flap moves into the fully closed position the flap moves a portion of the flexible annular sealing member relative to the body in a direction approximately parallel to the fluid flow direction.

16. The fluid flow regulating system of claim 13, wherein the fluid valve assembly comprises one of an air intake valve assembly, exhaust throttle valve assembly, turbocharger bypass valve assembly, and exhaust gas recirculation valve assembly.

* * * * *